United States Patent
Lu

(10) Patent No.: US 6,933,927 B2
(45) Date of Patent: Aug. 23, 2005

(54) BUTTON KEY STRUCTURE INTEGRATED WITH A SPEAKER

(75) Inventor: Kuo-Ping Lu, Taipei Hsien (TW)

(73) Assignee: ASUSTeK Computer Inc., Taipei (TW)

( * ) Notice: Subject to any disclaimer, the term of this patent is extended or adjusted under 35 U.S.C. 154(b) by 310 days.

(21) Appl. No.: 10/260,417

(22) Filed: Oct. 1, 2002

(65) Prior Publication Data

US 2003/0107549 A1 Jun. 12, 2003

(30) Foreign Application Priority Data

Dec. 26, 2001  (TW) .......................................... 90222969

(51) Int. Cl.⁷ ................................................ G09G 5/00
(52) U.S. Cl. ...................... 345/169; 345/168; 361/680; 200/5 R; 200/4; 235/472.01; 455/556.2
(58) Field of Search ................................ 345/156–169; 200/4, 5 R, 341; 455/556.2; 361/680, 681; 235/472.01

(56) References Cited

U.S. PATENT DOCUMENTS 4,081,631 A * 3/1978 Feder ......................... 200/5 A
6,570,994 B1 * 5/2003 Berthoud et al. ............ 381/423
6,622,920 B2 * 9/2003 Ho et al. ................ 235/472.01
6,680,676 B1 * 1/2004 Hayashi et al. ................ 341/22
6,717,074 B2 * 4/2004 Lu .............................. 200/5 R

FOREIGN PATENT DOCUMENTS

| JP | 07-302633 | * 11/1995 |
| JP | 09-331165 | * 12/1997 |

* cited by examiner

Primary Examiner—Lun-yi Lao
(74) Attorney, Agent, or Firm—Birch, Stewart, Kolasch & Birch, LLP

(57) ABSTRACT

A button key structure integrated with a speaker consists of a direction key, a lower lid and a speaker. The direction key is hollow and includes an outer key and an inner key. The outer key is slightly smaller than the key opening and is extended outside the casing. The inner key is slightly larger than the key opening and is confined between the casing and a circuit board. The inner key has contact points located at the bottom to correspond to touch switches located on the circuit board. The lower lid couples with the direction key to form a housing compartment to house the speaker. The speaker connects electrically to the circuit board through a conductive rubber.

9 Claims, 6 Drawing Sheets

BUTTON KEY STRUCTURE INTEGRATED WITH A SPEAKER

FIELD OF THE INVENTION

The present invention relates to a button key structure for electronic devices and particularly a button key structure integrated with a speaker.

BACKGROUND OF THE INVENTION

With continuous innovations of electronic techniques and rapid developments of digital technologies, 3C information products have become indispensable outfits and helpful working tools for many people. 3C information products include notebook computers, mobile phones, personal digital assistants (PDAs), handheld computers (Palms) and the like. PDA, because of its powerful functions, user-friendliness and light and compact size, has been widely accepted by consumers. In addition, PDA can also include many other functions such as to access the Internet in a wireless fashion, communication, and video/audio enabling. It has become a prevailing trend of the information product development nowadays.

Refer to FIG. 1 for a conventional PDA. It includes a casing 10, a display panel 12, a direction key 14 and a plurality of hot keys 16. The casing 10 has a panel opening and a plurality of key openings formed on the surface to match and accommodate the display panel 12, the direction key 14 and the hot keys 16. The direction key 14 and the hot keys 16 are extended above the key openings. Users can depress the direction key 14 or the hot keys 16 to perform operations of the PDA. The information provided by the PDA are displayed on the display panel 12.

Referring to FIGS. 2A and 2B, the key structure adopted by conventional techniques for PDAs includes a direction key 21, a casing 22 and a circuit board 23. The casing 22 has a key opening 24 formed on the surface thereof. The direction key 21 consists of an outer key 25 and an inner key 26. The outer key 25 is slightly smaller than the key opening 24 while the inner key 26 is slightly larger than the key opening 24. Hence the outer key 25 is extended outside the key opening 24 while the inner key 26 is confined between the casing 22 and a circuit board 23. The key connects to the circuit board 23 through an elastic element 27 (such as a spring). The elasticity of the elastic element 27 enables the direction key 21 to turn and tilt at a small angle in four directions.

The direction key 21 has four indicating notations located on the four corners (up, down, left and right) of the outer key 25. The four bottom corners (up, down, left and right) of the inner key 26 has four contact points 28 corresponding respectively to four touch switches 29 located on the surface of the circuit board 23. When in use, users may select one of the notations and depress downwards, the direction key 21 is tilted at the depressing spot to make the contact point 28 in contact with the touch switch 29 of the circuit board 25. The PDA then process programs according to the commands input from the direction key 21. The processed results are displayed on the display panel (not shown in the drawings), and users may read the messages and information on the display panel.

These days, PDA equipped with video/audio or mobile phone capabilities has become an important feature. One of the critical elements to achieve the aforesaid functions is the speaker. To make the PDA competitive, it must be lean and light, and has a big enough display screen. To meet those requirements, conventional techniques of PDA have fully utilized the interior space of the casing for the configuration of the necessary elements or the arrangement of external keys. It is very difficult to allocate an additional space for the speaker. When trying to adopt the conventional techniques to add the speaker on the front side of the PDA without increasing the total size, the size of the display panel has to be shrunk. To keep the speaker on the front side of the PDA without reducing the size of the display panel, total size of the PDA should be increased. To install the speaker on the rear side of the PDA will increase the total thickness. Besides, when the speaker is located on the rear side of the PDA, the audio quality is not desirable. When it is coupled with the mobile phone, the voice output from the rear side has the risk of being eavesdropped.

Because of the conventional techniques have difficulty to include the speaker in the PDA and still meet the requirements of lean and light and a large enough display screen, it is necessary to develop new techniques to resolve the problem.

SUMMARY OF THE INVENTION

The primary object of the invention is to provide a button key structure integrated with a speaker to offer PDAs or related electronic products with audio function without increasing the thickness and size of the products, or reducing the size of the display screen.

The button key structure integrated with a speaker of the invention is adopted for use on PDAs or related electronic products. The PDA includes a casing with a key opening formed thereon and a circuit board located therein. The circuit board has a surface with four touch switches mounted thereon in four different directions.

The invention includes a direction key, a lower lid and a speaker. The direction key is hollow and consists of an outer key and an inner key, and has a lower opening facing downwards. The outer key is slightly smaller than the key opening and the inner key is slightly larger than the key opening. When the direction key is wedged in the key opening from the interior of the casing, the outer key is extended outside the surface of the casing while the inner key is confined between the casing and the circuit board. The outer key has four indicating notations located on the surface of the four corners. The bottom of the inner key has four contact points located at four corners corresponding to the four touch switches located on the surface of the circuit board. The lower lid and the lower opening of the direction key is coupled to form a housing compartment to accommodate the speaker. The speaker connects to the circuit board through a conductive rubber. The speaker is preferably located in the middle portion of the housing compartment. The space between the speaker and the direction key becomes an upper acoustic chest, while the space between the speaker and the lower lid becomes a lower acoustic chest. The upper and the lower acoustic chests can improve the audio quality of the speaker.

When in use, users may select one of the notations at one corner of the outer key and depress downwards, the direction key is tilted at the depressing spot to make the contact point of the inner key in contact with the touch switch of the circuit board. The PDA then processes programs according to the input commands. As the speaker is installed in the housing compartment formed between the direction key and the lower lid, the invention can generate audio effect for the PDA without increasing the total thickness and size of the PDA, or reducing the size of the display screen.

The foregoing, as well as additional objects, features and advantages of the invention will be more readily apparent from the following detailed description, which proceeds with reference to the accompanying drawings.

DESCRIPTION OF THE PREFERRED EMBODIMENT

The button key structure integrated with a speaker of the invention has a housing compartment formed in a direction key to house the speaker so that electronic product being adopted (such as a PDA) can equip with audio function without increasing the total thickness or size of the product, or reducing the size of the display screen. Details of the invention are depicted below referring to the embodiment.

Figure 1:
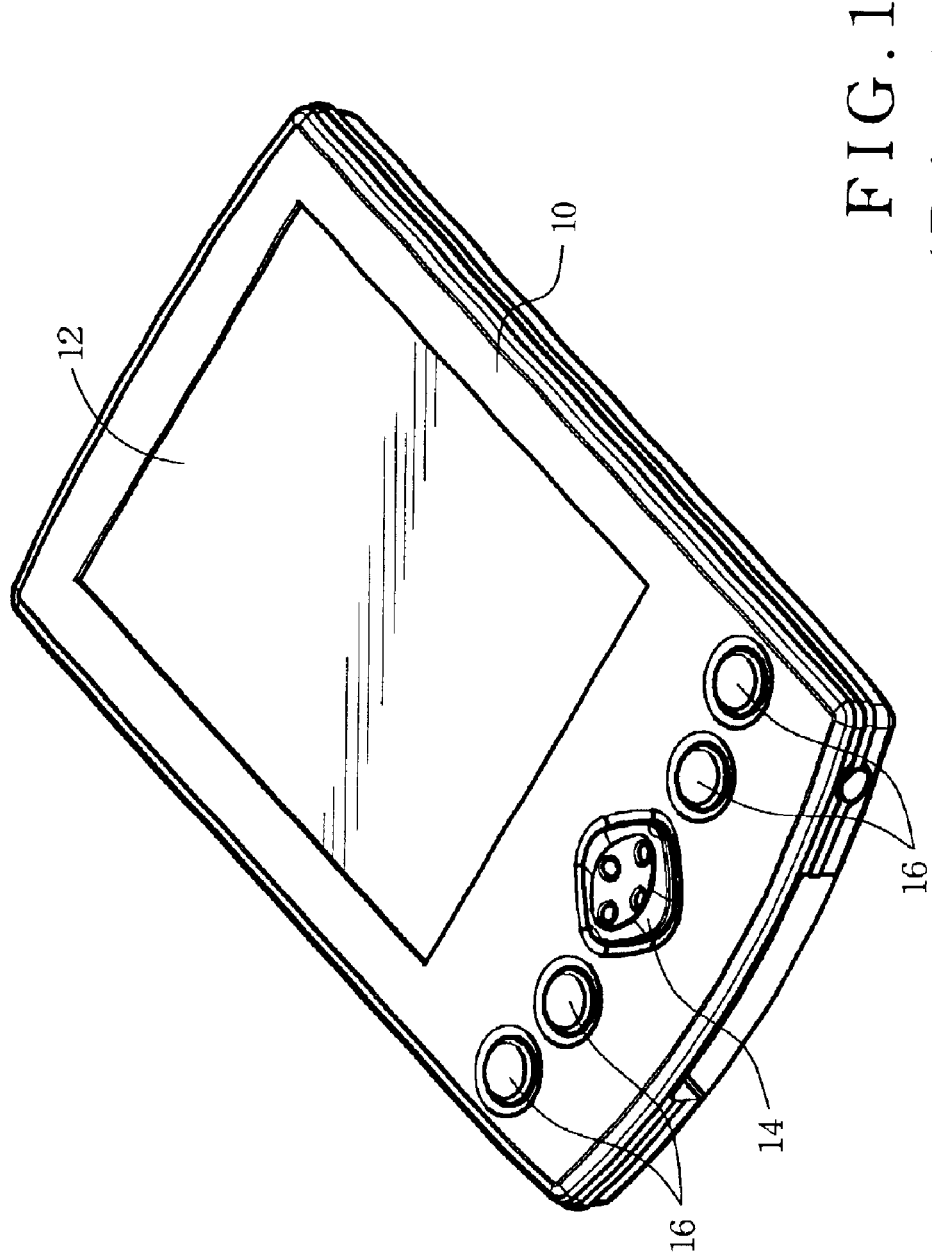
FIG. 1 is a perspective view of a conventional PDA.
Figure 2A:
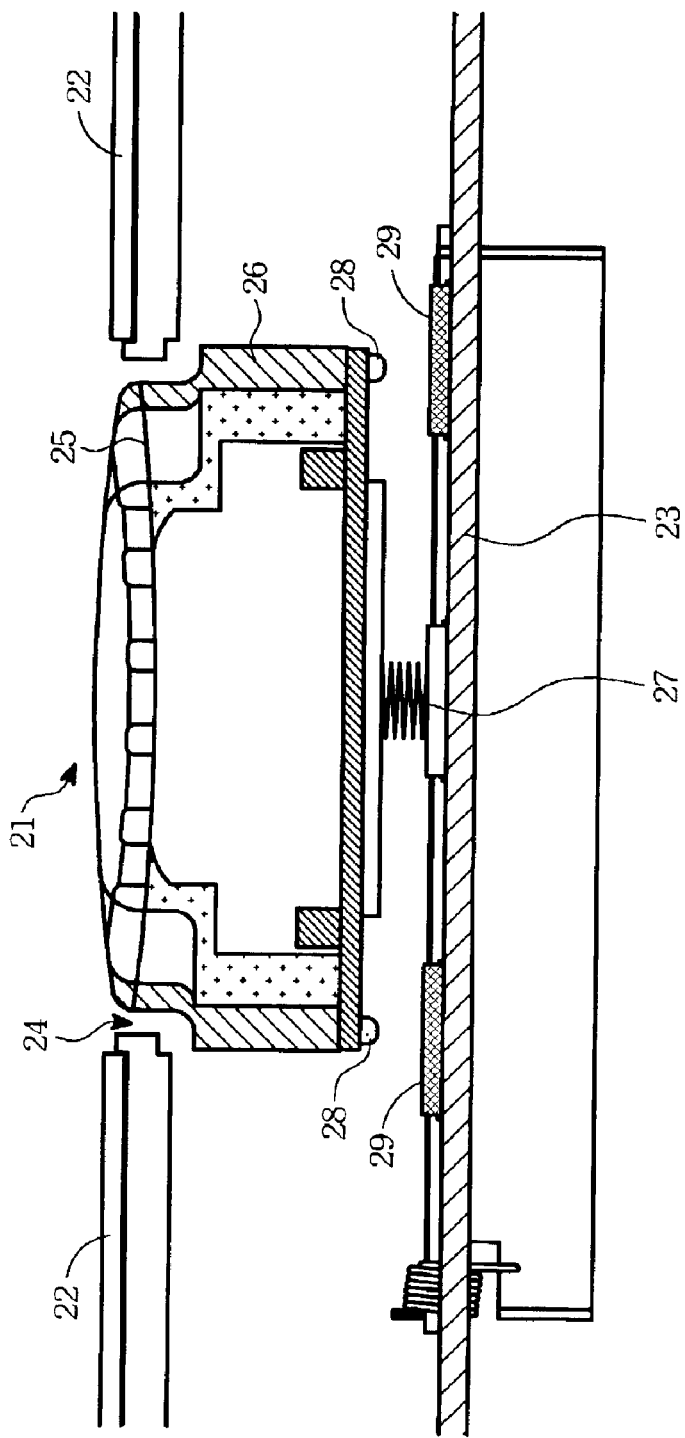
FIGS. 2A and 2B are schematic views of a conventional button key structure for a PDA.
Figure 2B:
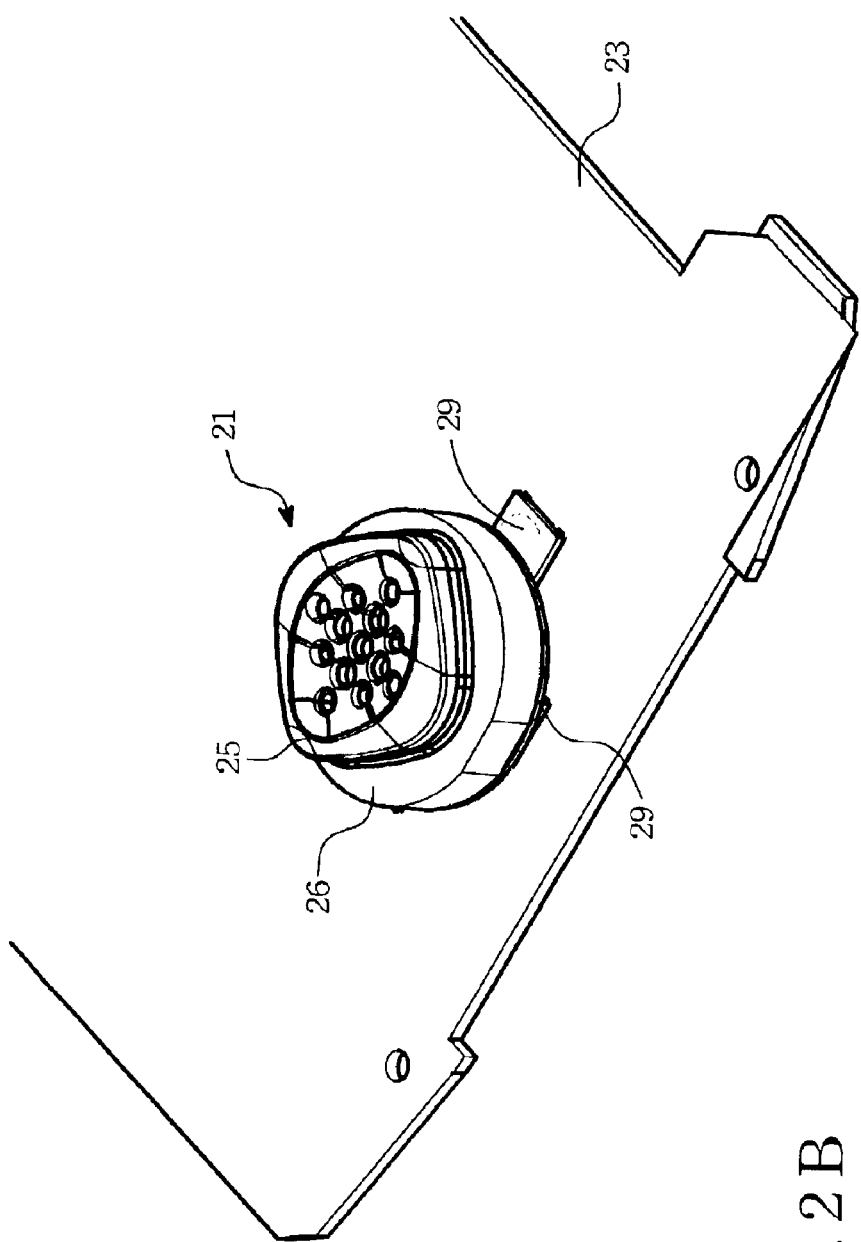
Figure 3:
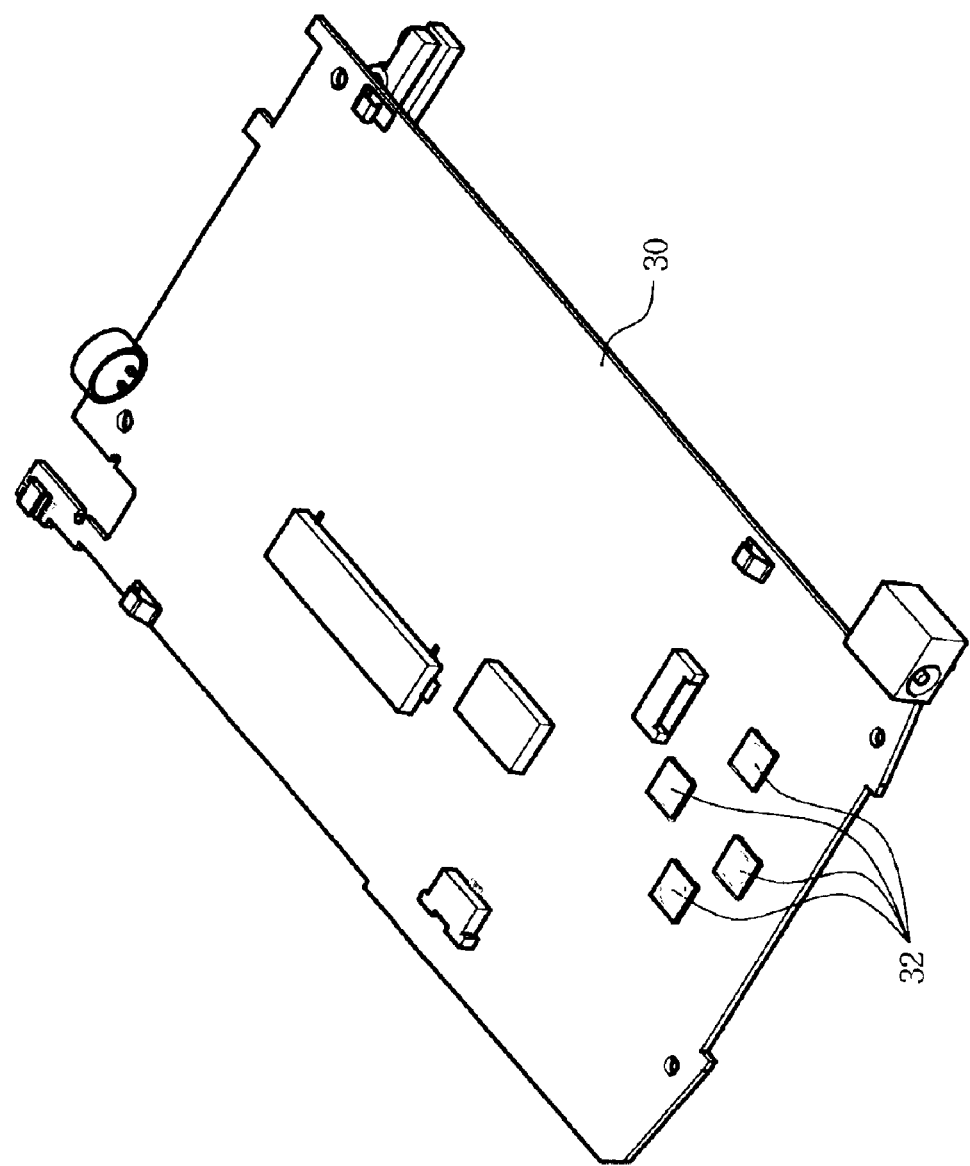
FIG. 3 is a schematic view of a circuit board of the invention.

The button key structure integrated with a speaker of the invention is adopted on PDAs or related electronic products. Whatever the products, they must have a circuit board 30 located in the interior to couple with the button key structure of the invention. Refer to FIG. 3 for an embodiment of a circuit board 30 of the invention. The circuit board 30 has a plurality of touch switches 32 located on the surface thereof.

Figure 4A:
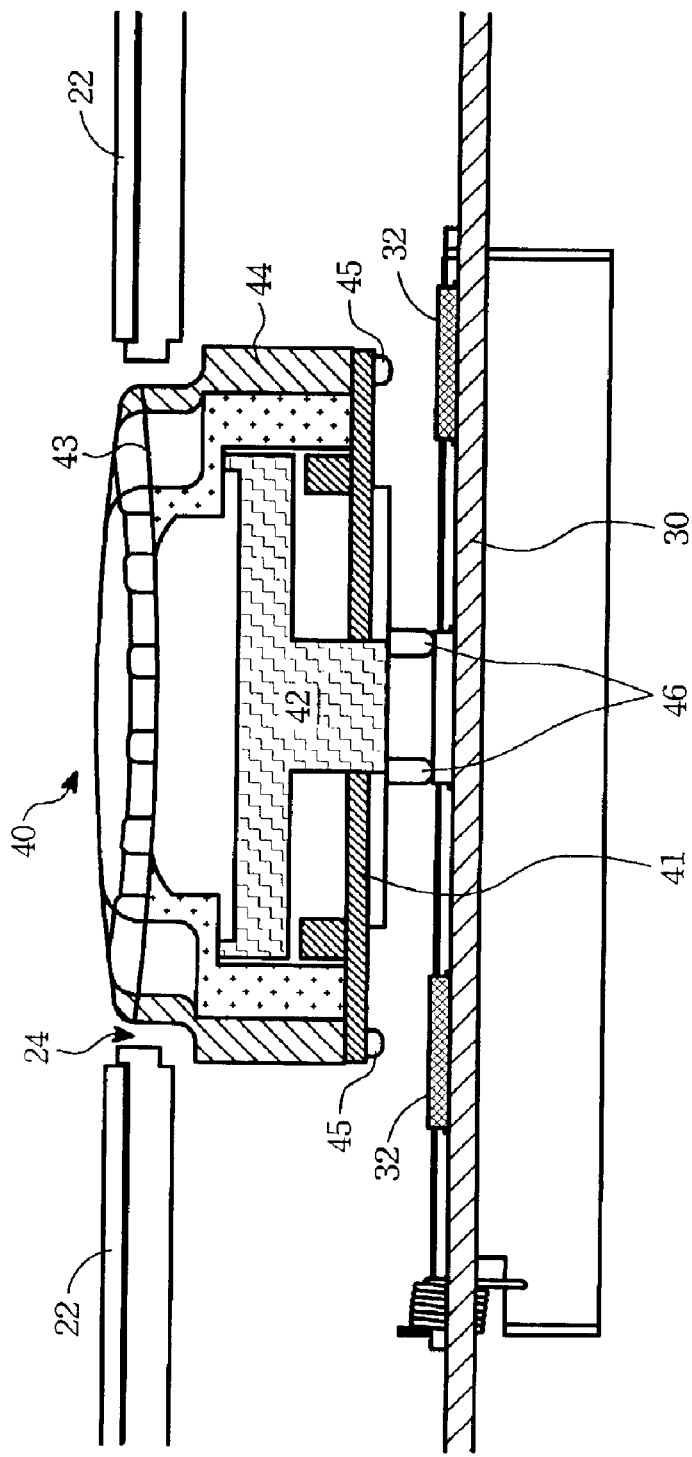
FIGS. 4A and 4B are schematic views of the button key structure integrated with a speaker according to the invention.
Figure 4B:
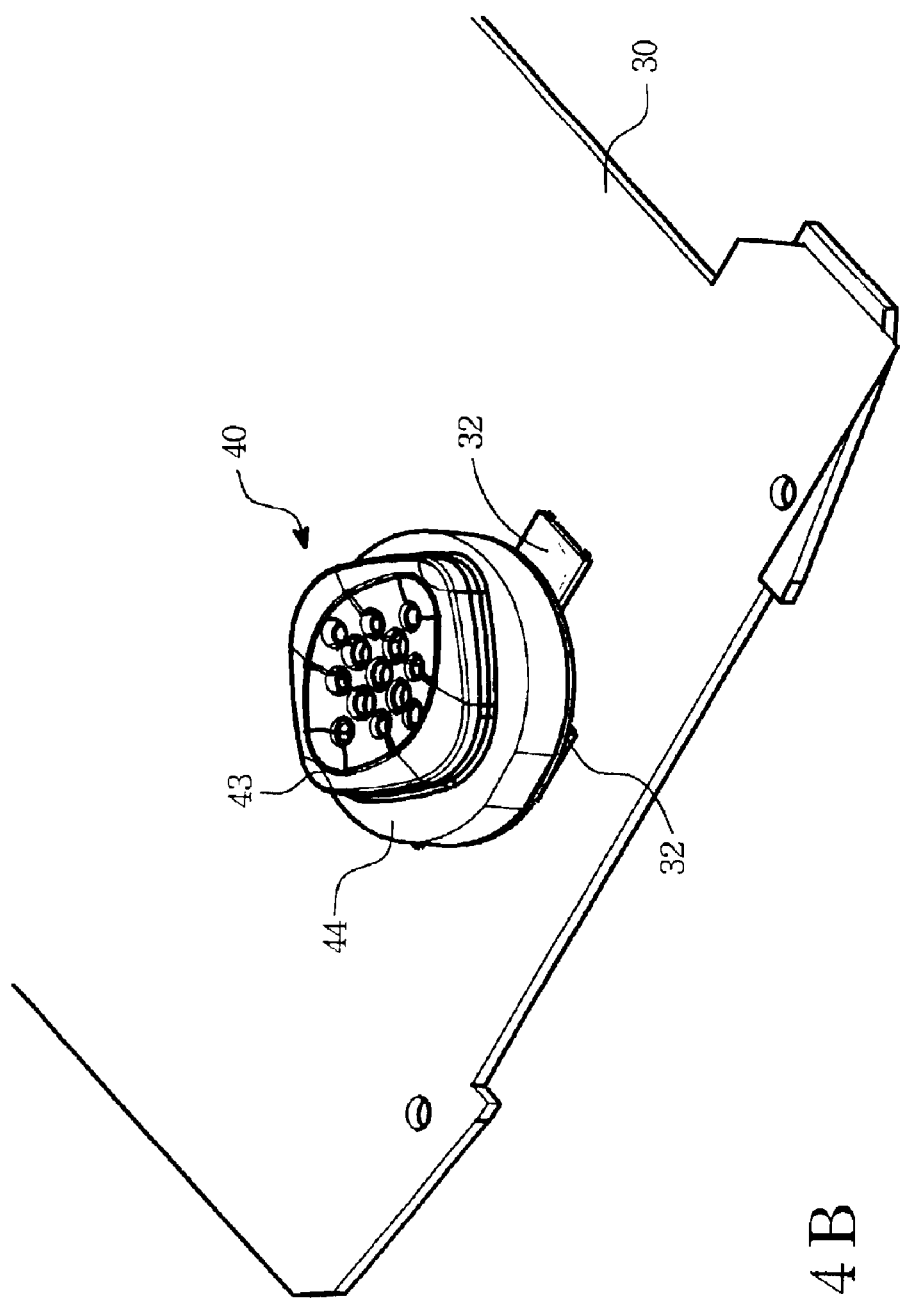

Referring to FIGS. 4A and 4B, the button key structure of the invention includes a direction key 40, a lower lid 41 and a speaker 42. The direction key 40 is hollow and consists of an outer key 43 and an inner key 44, and has a lower opening facing downwards. The outer key 43 is slightly smaller than the key opening 24 and the inner key 44 is slightly larger than the key opening 24. When the direction key 40 is wedged in the key opening 24 from the interior of the casing 22, the outer key 43 is extended outside the surface of the casing 22 while the inner key 44 is confined between the casing 22 and the circuit board 30. The outer key 43 has four indicating notations located on the four corners (up, down, left and right) of the surface. The bottom of the inner key 44 has four contact points 45 located at four corners (up, down, left and right) corresponding to four touch switches 32 located on the surface of the circuit board 30. The contact points 45 are formed in struts. The surface of the touch switches 32 is bonded to a rubber element. When any one of the indicating notations of the direction key 40 is depressed, the strut compresses the touch switch 32 of the circuit board 30 through the rubber element to generate a desired touch effect.

The lower lid 41 and the lower opening of the direction key 40 is coupled to form a housing compartment to accommodate the speaker 42. The speaker 42 and the circuit board 30 are connected electrically through a conductive rubber 46. The lower lid 41 may be an annular cover plate with a carved opening or a cover plate with a conductive rubber opening to enable the conductive rubber 46 to run though to establish electric connection with the circuit board 30 and the speaker 42. The speaker 42 is preferably located in the middle portion of the housing compartment. The space between the speaker 42 and the direction key 40 becomes an upper acoustic chest, while the space between the speaker 42 and the lower lid 41 becomes a lower acoustic chest. The upper and the lower acoustic chests can improve the audio quality of the speaker.

When in use, an user depresses one of the indicating notations at the four corners of the outer key, the direction key is tilted on the spot being depressed. The contact point of the inner key is in contact with the touch switch of the circuit board. And the PDA processes the programs according to the input commands. As the speaker is installed in the housing compartment formed between the direction key and the lower lid, the invention can generate audio effect for the PDA without increasing the total thickness and size of the PDA, or reducing the size of the display screen.

According to the invention, the speaker is housed in a space formed between the direction key and the lower lid. The space can provide the audio effect without increasing the total thickness and size of the PDA, or reducing the size of the display panel.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A button key structure integrated with a speaker adopted for use on an electronic product that must be operated through button keys and has a casing with a key opening formed thereon and has a circuit board mounted with a plurality of touch switches located therein, comprising:

a hollow direction key including an outer key and an inner key with a lower opening facing downwards, the outer keying being smaller than the key opening and being extended outside the surface of the casing, the inner key being larger than the key opening and being confined between the casing and the circuit board, the inner key having a plurality of contact points located on a bottom thereof corresponding to the touch switches of the circuit board;

a lower lid coupled with the lower opening of the direction key to form a housing compartment; and a speaker located in the housing compartment between the direction key and the lower lid and being connected electrically to the circuit board through a conductive rubber.

2. The button key structure integrated with a speaker of claim 1, wherein the surface of the outer key has a plurality of indicating notations formed thereon corresponding to the contact points of the inner key.

3. The button key structure integrated with a speaker of claim 2, wherein four indicating notations are formed on the outer key and located respectively at an upper corner, a lower corner, a left corner and a right corner of the direction key.

4. The button key structure integrated with a speaker of claim 1, wherein the contact points located at the bottom of the inner key are struts, the touch switch having a surface bonding to a rubber element, the strut pressing the touch switch through the rubber element when the direction key is depressed in one direction.

5. The button key structure integrated with a speaker of claim 1, wherein the speaker and the lower lid form a spare space to become a lower acoustic chest of the speaker.

6. The button key structure integrated with a speaker of claim 1, wherein the speaker and the direction key form a spare space to become an upper acoustic chest of the speaker.

7. The button key structure integrated with a speaker of claim 1, wherein the lower lid is an annular cover plate with a carved opening to allow the conductive rubber to run through the lower lid and the circuit board to connect electrically with the speaker.

8. The button key structure integrated with a speaker of claim 1, wherein the lower lid is an annular cover plate with a conductive rubber opening to allow the conductive rubber to run through the lower lid and the circuit board to connect electrically with the speaker.

9. The button key structure integrated with a speaker of claim 5, wherein the speaker and the direction key form a spare space to become an upper acoustic chest of the speaker.

* * * * *